K. R. PETERS.
UNIVERSAL JOINT.
APPLICATION FILED APR. 7, 1917.
1,245,379.
Patented Nov. 6, 1917.
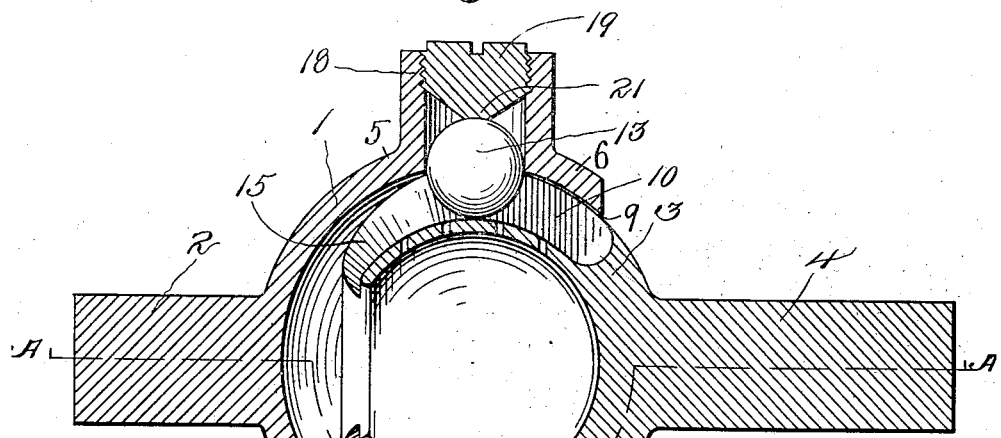
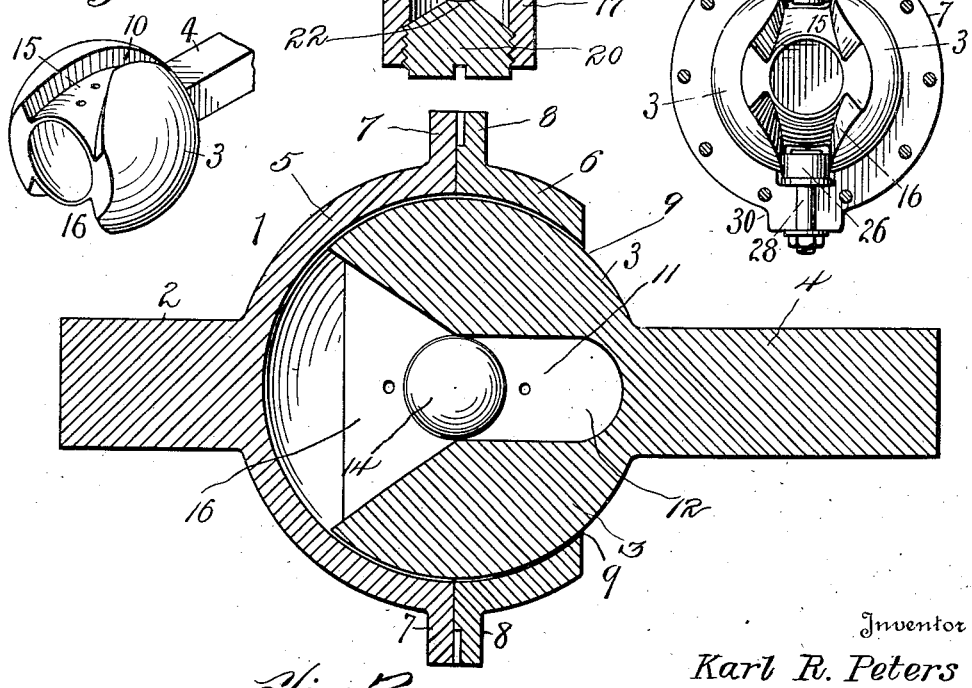
Inventor
Karl R. Peters
By F. DeWitt Goodwin
Attorney

UNITED STATES PATENT OFFICE.

KARL R. PETERS, OF PHILADELPHIA, PENNSYLVANIA.

UNIVERSAL JOINT.

1,245,379.  Specification of Letters Patent.  Patented Nov. 6, 1917.

Application filed April 7, 1917. Serial No. 160,355.

*To all whom it may concern:*

Be it known that I, KARL R. PETERS, a citizen of the United States, residing at Philadelphia, in the county of Philadelphia and State of Pennsylvania, have invented certain new and useful Improvements in Universal Joints, of which the following is a specification.

My invention relates to improvements in a universal joint, and the object of my invention is to construct a universal joint in such a manner that the variable velocity between the driving shaft and the driven shaft will be reduced to a minimum and the motion transmitted will be more uniform than can now be transmitted through the ordinary type of universal joint; a further object of my invention is to provide a universal joint having free movement in all directions and a still further object of my invention is to provide rotatable members forming the pivot points, to reduce the friction between the parts of the universal joint.

In carrying out my invention I employ a socket member provided with the pivot member and a spherical member having longitudinal recesses or grooves formed in the periphery thereof, into which recesses the pivot members enter and permit flexibility between the driving and the driven shaft, and I further provide the said recesses with flaring portions so that when the two shafts are not in alinement only one of the pivot members will act and the opposite pivot member will be free and will not bind against the walls forming the recess in the spherical member.

Referring to the accompanying drawings; Figure 1. is a longitudinal sectional view of my improved universal joint; Fig. 2. is a vertical section on line A—A Fig. 1; Fig. 3. is a perspective view of the spherical member of the joint, and Fig. 4. is a transverse section of the socket member, showing the inner end of the spherical member in full lines and showing a different form of pivot member.

In the drawings in which like reference characters refer to like parts, 1 represents the socket member mounted upon the shaft 2. 3 represents the spherical member rotatably mounted within the socket member 1, and provided with the shaft 4.

The socket member 1 is formed of two parts 5 and 6 provided with flanges 7 and 8 for securing the parts 5 and 6 rigidly together to retain the spherical member 3 in the socket formed by the parts 5 and 6. The part 6 of the socket member 1 is provided with a circular opening 9 through which the shaft 4 projects.

The spherical member 3 is provided with grooves, formed upon opposite sides thereof, to receive the pivot members. The portions 10 and 11 of said grooves extend longitudinally and are formed by parallel walls and the portions 15 and 16 of the said grooves are formed by the flaring walls which increase the width of the grooves.

The socket member 1 and the spherical member 3 are rotated simultaneously by the pivot members carried by the socket member 1. The pivot members may be in the form of a stud shaft but I prefer to use a ball to form the pivot point. As shown in Figs. 1 and 2 the balls 13 and 14 are loosely mounted in the tubular bearings 17 and 18 formed in the parts 5 and 6 of the socket member 1. The balls 13 and 14 are retained in the bearings 17 and 18 by the plugs 19 and 20 which are screwed or otherwise secured in said bearings. The plugs 19 and 20 are provided with reduced end portions forming bearing surfaces 21 and 22 which hold the balls in the grooves formed in the spherical member 3. In Fig. 4 the pivot members are shown in the form of rollers 25 and 26 which are rotatably mounted upon the stud shafts 27 and 28 secured in the enlarged portions 29 and 30 of the socket member 1.

The pivot members enter the grooves formed in the spherical member and as said grooves are elongated the spherical member may rotate upon its center and the shaft 4 may be inclined at an angle to the shaft 2.

The portions 10 and 11 of the grooves formed in the spherical member are equal in width to the diameter of the pivot members. Said parallel portions 10 and 11 of the grooves extend from a line drawn through the center of the spherical member at right angles to the length of the shaft 4 and continue around the surface of the spherical member, toward the shaft 4, a sufficient distance to permit the shafts 2 and 4 to assume the required angles. The portions 15 and 16 of the said grooves are enlarged from the said transverse center line and flare toward the free or open end of the spherical member 3.

It will be seen that when the shafts 2 and 4 are in alinement the power will be communicated through both of the pivot members and that when the shaft 4 is inclined at an angle to the shaft 2, one of said pivot members will engage the spherical member in the parallel portion 10 or 11 of the grooves and the opposite pivot member will not engage the spherical member due to the enlarged or flaring portion 15 or 16 of the said grooves in the spherical member.

Thus, when the shafts 2 and 4 are out of alinement, only one pivot member at a time will communicate the power through the shafts and the opposite pivot member will be free and will not bind, nor increase the speed of the driven shaft throughout a portion of the revolution as is the case with the universal joints now in general use.

I do not wish to confine myself to the exact construction shown, as the parts may be reversed, in which case the spherical member may carry the pivot members and the socket member may be provided with the elongated grooves to receive the pivot members, without departing from my invention.

Having thus described my invention I desire to claim and secure by Letters Patent:—

1. A universal joint having a socket member, a spherical member, pivot members carried by one of said members and engaging the opposite one of said first two mentioned members, one of said first two mentioned members having grooves formed therein to receive the pivot members, one portion of the said grooves being of a width equal to the diameter of the pivot members, and the other portion of said grooves being wider than the first mentioned portion, whereby in certain relative positions of the two first mentioned members one of said pivot members will have unrestricted movement in relation to one of said first mentioned members.

2. A universal joint having a socket member, a spherical member, pivot members carried by one of said members and engaging the opposite one of said first two mentioned members, one of said first two mentioned members having grooves formed therein to receive the pivot members, one portion of said grooves being of a width equal to the diameter of the pivot member, and the other portion of the said grooves being wider than the first mentioned portion of said grooves, whereby in certain relative positions of the two first mentioned members one of the pivot members engages the narrower portion of the groove and communicates the power to the other one of said first two mentioned members and the other one of the pivot members is unrestricted in relation to one of said first mentioned members.

3. A universal joint having a shaft, a socket member on said shaft, a spherical member mounted in the said socket member, a shaft on the spherical member, pivot members carried by one of said first mentioned members for communicating power to the other one of said members, one of said pivot members being in engagement with the two first mentioned members and the other one of said pivot members being out of engagement with one of said first mentioned members when the said shafts are out of alinement.

4. A universal joint having a socket member, a spherical member mounted in the socket member, pivot members between the first mentioned members, said spherical member having grooves formed therein with one portion of the grooves equal to the diameter of a pivot member, and the other portion of the said grooves wider than the diameter of the pivot member, and the said spherical member having the wider portion of the said grooves formed therein located diametrically opposite to the narrower portion of the said grooves.

5. A universal joint comprising ball and socket members, opposing pivot members between said first mentioned members, one of said first mentioned members having races formed therein to receive the pivot members, one portion of said races being of a width equal to the diameter of the pivot member and the other portion of the races being materially wider than the said first mentioned portion to disengage one pivot member from one of the first mentioned members when the first mentioned members are in certain relative positions.

6. A universal joint having a socket member, a shaft on the latter, a spherical member mounted in the socket member, a shaft on the spherical member, bearings oppositely disposed upon the socket member, balls loosely mounted in the bearings, said spherical member having grooves formed therein to receive said balls, said grooves being of equal width to the dimensions of the balls from the transverse center line of the spherical member to a point adjacent to the shaft on said spherical member and said grooves increasing in width from the said transverse center line in the opposite direction.

In testimony whereof I affix my signature in the presence of two witnesses.

KARL R. PETERS.

Witnesses:
ROBERT M. WALLACE,
FRANCES L. GOODWIN.